United States Patent
Kanan et al.

(10) Patent No.: US 11,482,864 B1
(45) Date of Patent: Oct. 25, 2022

(54) SYSTEM AND METHOD FOR POWER DISTRIBUTION OPTIMIZATION

(71) Applicant: 8ME NOVA, LLC, El Dorado Hills, CA (US)

(72) Inventors: Nadim Kanan, Elk Grove, CA (US); Gautham Ramesh, Emeryville, CA (US); Lukas Mercer Hansen, El Dorado Hills, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 17/857,522

(22) Filed: Jul. 5, 2022

(51) Int. Cl.
*H02J 3/14* (2006.01)
*H02J 3/00* (2006.01)

(52) U.S. Cl.
CPC .............. *H02J 3/144* (2020.01); *H02J 3/004* (2020.01); *H02J 3/0075* (2020.01)

(58) Field of Classification Search
None
See application file for complete search history.

(56) References Cited

U.S. PATENT DOCUMENTS

| 2017/0170684 A1* | 6/2017 | Matthey | G05B 13/026 |
| 2021/0006076 A1* | 1/2021 | Rentel | H02J 7/0024 |
| 2021/0083505 A1* | 3/2021 | Beaston | H02J 3/381 |

* cited by examiner

*Primary Examiner* — Jared Fureman
*Assistant Examiner* — Joel Barnett
(74) *Attorney, Agent, or Firm* — Foley & Lardner LLP

(57) ABSTRACT

An illustrative embodiment disclosed herein is method for power distribution optimization. In some embodiments, the method includes determining an efficiency for each power block of a plurality of power blocks of a power distribution optimization system, determining a characteristic for each power block, determining a power to provide, selecting a first percentage of the power that a first power block is to provide and a second percentage of the power that a second power block is to provide at least based on the efficiency for each power block, the characteristic for each power block, and the power to provide, wherein the first percentage of the power is greater than the second percentage of the power, and sending a dispatch command to cause the first power block to provide the first percentage of the power and the second power block to provide the second percentage of the power.

30 Claims, 5 Drawing Sheets

SYSTEM AND METHOD FOR POWER DISTRIBUTION OPTIMIZATION

BACKGROUND

Battery storage technology can ensure that homes and businesses can be powered by green energy even when the sun isn't shining, or the wind has stopped blowing. Battery storage, or battery energy storage systems (BESS), are devices that can enable energy from renewables, like solar and wind, to be stored and then released when customers or offtakers may need power.

SUMMARY

Aspects of the present disclosure relate generally to energy storage systems, and more particularly to a system and method for power distribution optimization.

An illustrative embodiment disclosed herein is a power distribution optimization system. The system includes a plurality of power blocks. Each power block of the plurality of power blocks includes a power conditioning system and at least one battery coupled to the power conditioning system. The system includes an energy management apparatus coupled to the plurality of power blocks. The energy management apparatus includes a processor and a memory. The memory includes programmed instructions that, when executed by the processor, cause the energy management apparatus to determine an efficiency for each power block of the plurality of power blocks and determine a characteristic for each power block of the plurality of power blocks. In some embodiments, the characteristic is one or more of thermal behavior, a health state, a balancing state, forecasted usage, or an operation cost. In some embodiments, the memory includes the programmed instructions that, when executed by the processor, cause the energy management apparatus to determine a power to provide and select a first percentage of the power that a first power block of the plurality of power blocks is to provide and a second percentage of the power that a second power block of the plurality of power blocks is to provide at least based on the efficiency for each power block of the plurality of power blocks, the characteristic for each power block of the plurality of power blocks, and the power to provide. In some embodiments, the first percentage of the power is greater than the second percentage of the power. In some embodiments, the memory includes the programmed instructions that, when executed by the processor, cause the energy management apparatus to send a dispatch command to cause the first power block of the plurality of power blocks to provide the first percentage of the power and the second power block of the plurality of power blocks to provide the second percentage of the power.

Another illustrative embodiment disclosed herein is a non-transitory computer readable medium. In some embodiments, the medium includes instructions that, when executed by a processor, cause the processor to determine an efficiency for each power block of the plurality of power blocks and determine a characteristic for each power block of the plurality of power blocks. In some embodiments, the characteristic is one or more of thermal behavior, a health state, a balancing state, forecasted usage, or an operation cost. In some embodiments, the medium includes the instructions that, when executed by the processor, cause the processor to determine a power to provide and select a first percentage of the power that a first power block of the plurality of power blocks is to provide and a second percentage of the power that a second power block of the plurality of power blocks is to provide at least based on the efficiency for each power block of the plurality of power blocks, the characteristic for each power block of the plurality of power blocks, and the power to provide. In some embodiments, the first percentage of the power is greater than the second percentage of the power. In some embodiments, the medium includes the instructions that, when executed by the processor, cause the processor to send a dispatch command to cause the first power block of the plurality of power blocks to provide the first percentage of the power and the second power block of the plurality of power blocks to provide the second percentage of the power.

Another illustrative embodiment disclosed herein is a method. In some embodiments, the method includes determining, by a processor, an efficiency for each power block of the plurality of power blocks and determining, by the processor, a characteristic for each power block of the plurality of power blocks. In some embodiments, the characteristic is one or more of thermal behavior, a health state, a balancing state, forecasted usage, or an operation cost. In some embodiments, the method includes determining, by the processor, a power to provide and selecting, by the processor, a first percentage of the power that a first power block of the plurality of power blocks is to provide and a second percentage of the power that a second power block of the plurality of power blocks is to provide at least based on the efficiency for each power block of the plurality of power blocks, the characteristic for each power block of the plurality of power blocks, and the power to provide. In some embodiments, the first percentage of the power is greater than the second percentage of the power. In some embodiments, the method includes sending, by the processor, a dispatch command to cause the first power block of the plurality of power blocks to provide the first percentage of the power and the second power block of the plurality of power blocks to provide the second percentage of the power.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
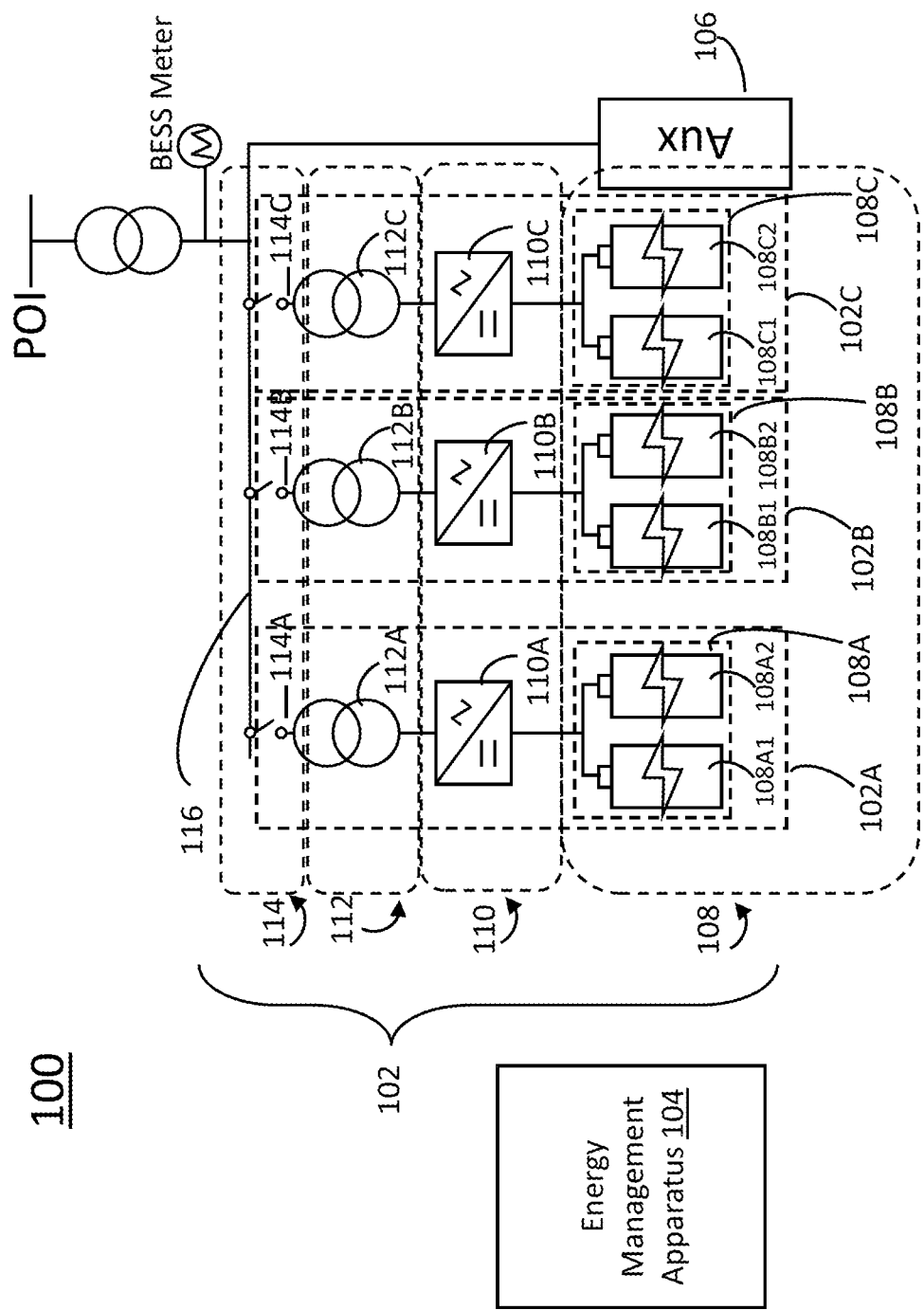
FIG. 1 illustrates a block diagram of an energy storage system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Embodiments lacking the improvements disclosed herein enable all the power blocks, and all the batteries therein, to provide power, and equally allocate the power signals among the power blocks. Such a scheme may result in excessive power losses and/or a reduction of a lifetime of the batteries. Disclosed herein are embodiments of a distribution optimization system, apparatus and method that unevenly allocates real or reactive power signals among power blocks based on the real or reactive power efficiency. Advantageously, some of the embodiments disclosed herein reduce power losses in providing power to the load by running all the enabled power blocks at or near their maximum power efficiency.

Further disclosed herein are embodiments of a distribution optimization system, apparatus and method that unevenly allocates real or reactive power signals among power blocks based on different performance characteristics, state of charge, state of health, temperature profile, state of balancing, forecasted usage, operation cost, and/or other "vitals" of each of the power blocks. The system, apparatus, and method may unevenly allocate real or reactive power signals among power blocks based on one or more of these characteristics in addition to the real or reactive power efficiency. Advantageously, some of the embodiments disclosed herein reduce power losses and reduce the likelihood of a power block failure by more frequently running power blocks that have a better performance characteristics or state of health.

Further disclosed herein are embodiments of a distribution optimization system, apparatus and method that balances the state of charge of a power block by charging the power block at or up to a higher level than other power blocks, or discharging down to a lower level than other power blocks if the power block includes a difference of a maximum battery cell voltage and a minimum battery cell voltage is above a threshold. In some embodiments, in response to detecting that a state of charge among battery cells within a power block is unbalanced, the apparatus and method charges the power block until the battery cells within the power block are balanced. Advantageously, some of the embodiments disclosed herein reduce power losses by avoiding the scenario of unbalanced power blocks, or some of the batteries therein, discharging excessively earlier than some other power blocks. Such a scenario can cause the other power blocks to have to operate at a lower efficiency, or accumulate more wear-and-tear, during the time the unbalanced power blocks do not provide power due to being discharged.

Further disclosed herein are embodiments of a distribution optimization system, apparatus, and method that allows some power blocks to charge while the other power blocks discharge. The system, apparatus, and method can alternate which power blocks charge and which power blocks discharge. In some embodiments, such techniques can be beneficial to battery health.

FIG. 1 illustrates a block diagram of an energy storage system 100, in accordance with some embodiments of the present disclosure. The energy storage system 100 may be referred to as a power plant.

The system 100 includes a number of power blocks 102. For example, the system 100 shows a power block 102A, a power block 102B, and a power block 102C, although the system 100 may include greater than or less than three power blocks without departing from the scope of the present disclosure. In some embodiments, the power block 102 is the smallest dispatchable unit. The power blocks 102 are adapted to store energy such as solar energy, generate direct-current (DC) power (signal), convert the DC power to alternate-current (AC) power (signal), and send the AC power to devices connected to the system 100 or to a power grid connected to the system 100. Each power block 102 can be referred to as a battery energy storage system (BESS).

The system 100 includes an energy management apparatus 104, which is adapted to optimize power distribution. For example, the energy management apparatus 104 adapts the power blocks 102 so that power is unevenly allocated among the power blocks. The energy management apparatus 104 can adapt the power blocks 102 so that some of the power blocks 102 are sending AC power to devices or the grid, and some of the power blocks 102 are disabled. In some embodiments, the energy management apparatus 104 ensures that, over time, different power blocks 102 are selected to send power. More details of the energy management apparatus 104 are provided below in describing FIG. 2.

The system 100 includes an auxiliary load panel 106, which is adapted to supply power to a number of power conditioning systems 110. In some embodiments, the auxiliary load panel 106 can supply power to other components that provide control or conditioning functionality for the system 100. In some embodiments, the auxiliary load panel 106 is powered by the power grid that is coupled to the system 100. In some embodiments, the auxiliary load panel 106 is powered by one or more of the power blocks 102. More details of powering the auxiliary load panel 106 with the power blocks 102 are provided below in describing FIG. 2.

The system 100 includes a number of battery cells 108. The battery cells 108 include multiple battery strings. For example, the power block 102A includes a battery string 108A, the power block 102B includes a battery string 108B, and the power block 102C includes a battery string 108C, although the system 100 may include greater than or less than three battery strings while remaining in the scope of the present disclosure. In some embodiments, the battery string is the smallest controllable unit. Each battery string includes two or more battery cells. For example, the battery string 108A includes battery cells 108A1 and 108A2, the battery string 108B includes battery cells 108B1 and 108B2, and the battery string 108C includes battery cells 108C1 and 108C2. The battery cells of a battery string can be coupled in parallel. In some embodiments, the battery cell is the smallest observable unit. The battery cells 108 are adapted to store energy such as solar energy and generate DC power based on the stored energy. In some embodiments, the battery cells 108 can be coupled to solar panels to store the solar energy received by the solar panels.

Each battery cell 108, battery string, and/or power block 102 can be characterized by its efficiency, its charge state (a.k.a. state of charge), its balancing state, its health state (a.k.a. state of health), its health state degradation, its efficiency degradation, its charge rate, its discharge rate, its nameplate power, its forecasted usage, its operation costs, and its thermal behavior. The efficiency can be defined as a ratio of the DC power provided to the power conditioning system 110 over the DC power that can be theoretically generated from the stored energy assuming no loss. The power block 102 can be characterized by both its real power efficiency and its reactive power efficiency. The charge state can be defined as the amount of charge currently stored. The balancing state of a power block, or battery string therein, can be defined as the difference in charge state among different battery cells of the power block. For example, the balancing state may be a difference of a maximum battery cell voltage and a minimum battery cell voltage among the battery cells of the power block. Voltage may be a proxy for charge. The health state (e.g., health status) of the power block 102 can be defined as a throughput of the power block, an age of the power block 102 (e.g., length of time that the power block 102 or battery cell 108 has been in operation, time since installation, time since activation, time enabled since installation/activation, etc.), an amount of wear-and-tear of the power block 102, a number of times turned on, a number of times charged, and the like. The health state degradation can be defined as a loss in state of health per an amount of time. Efficiency degradation can be defined as a loss of efficiency per an amount of time or per usage. For example, the efficiency degradation may be a loss of efficiency per year or per the number of times a power block 102 or battery cell 108 had gone through a charge and discharge cycle. The nameplate power can be defined as a theoretical maximum amount of power that the power block 102 or battery cell 108 can provide. The charge rate can be defined as rate at which the power block 102 or battery cell 108 is charging (e.g., storing/adding charge). The discharge rate can be defined as rate at which the power block 102 or battery cell 108 is discharging (e.g., releasing/losing charge). The nameplate power can be referred to as the nameplate capacity. The thermal behavior can be defined as a temperature or an amount of heat the battery cell generates and the temperature rise and drop behaviors. Although only efficiency, its charge state, its balancing state, its health state, its health state degradation, its efficiency degradation, its charge rate, its discharge rate, its nameplate power, and its thermal behavior, its forecasted usage, and its operation costs are disclosed, the power blocks 102 or battery cells 108 can be characterized by other characteristics while remaining within the scope of the present disclosure.

The system 100 includes a number of power conditioning systems (PCSs) 110. For example, the power block 102A includes a PCS 110A, the power block 102B includes a PCS 110B, and the power block 102C includes a PCS 110C, although the system 100 may include greater than or less than three of the PCSs 110 while remaining in the scope of the present disclosure. Each of the PCSs 110 can be coupled to one or more battery cells 108. For example, the PCS 110A is coupled to the battery string 108A, the PCS 110B is coupled to the battery string 108B, and the PCS 110C is coupled to the battery string 108C. Each of the PCSs 110 includes an inverter adapted to convert (e.g., invert) the DC power to AC power. In some embodiments, each inverter is a bi-directional inverter that can convert DC power to AC power as well as convert (e.g., rectify) AC power to DC power. In some embodiments, each of the PCSs include a cooling fan or other component that controls or conditions one or more of the battery cells 108. Each of the PCSs 110 may be coupled to the auxiliary load panel 106.

The system 100 includes a number of transformers 112. For example, the power block 102A includes a transformer 112A, the power block 102B includes a transformer 112B, and the power block 102C includes a transformer 112C, although the system 100 may include greater than or less than three of the transformers 112 while remaining in the scope of the present disclosure. Each of the transformers 112 can be coupled to a respective one of the PCSs 110. For example, the transformer 112A is coupled to the PCS 110A, the transformer 112B is coupled to the PCS 110B, and the transformer 112C is coupled to the PCS 110C. The transformers 112 are adapted to step-up or step-down a voltage of the AC power.

In some embodiments, the system 100 includes a number of switches 114. For example, the power block 102A can include a switch 114A, the power block 102B can include a switch 114B, and the power block 102C can include a switch 114C, although the system 100 may include greater than or less than three of the switches 114 while remaining in the scope of the present disclosure. Each of the switches 114 can be coupled to a respective one of the transformers 112. For example, the switch 114A can be coupled to the transformer 112A, the switch 114B can be coupled to the transformer 112B, and the switch 114C can be coupled to the transformer 112C. The transformers 112 are adapted to step-up or step-down a voltage of the AC power.

In some embodiments, the system 100 includes a bus 116 that is adapted to carry and distribute AC power from the power blocks 102 to one or more loads. The term "load" herein encompasses locally connected assets such as the auxiliary load panel 106 and assets connected through the grid. The bus 116 is coupled to each of the transformers 112, either directly, or via the respective switches 114. The bus 116 is coupled to the auxiliary load panel 106. The bus 116 may be coupled to one or more devices and the power grid.

Figure 2:
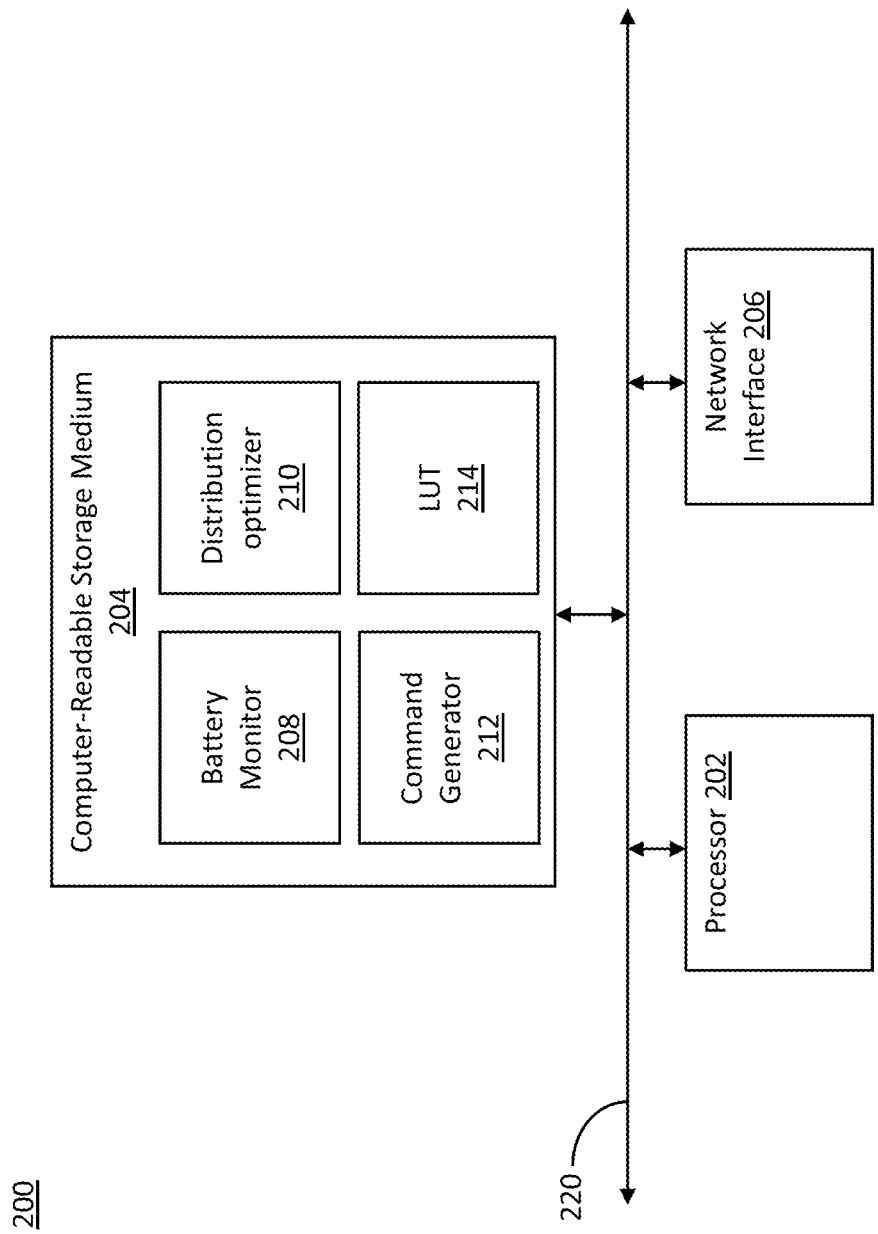
FIG. 2 illustrates a block diagram of an energy management apparatus, in accordance with some embodiments of the present disclosure.

FIG. 2 illustrates a block diagram of an energy management apparatus 200, in accordance with some embodiments of the present disclosure. The energy management apparatus 200 can be an implementation of the energy management apparatus 104 of FIG. 1. In some embodiments, the energy management apparatus 200 includes a processor 202. Processor 202 is configured to execute computer program code, scripts, applications, or services, such as a battery monitor 208, a distribution optimizer 210, and a command generator 212, encoded in computer-readable storage medium 204 (referred to herein as storage medium 204). In one or more embodiments, processor 202 is a central processing unit (CPU), a multi-processor, a distributed processing system, an application specific integrated circuit (ASIC), a process, and/or a suitable processing unit.

In some embodiments, the energy management apparatus 200 includes the storage medium 204. In one or more embodiments, the storage medium 204 is an electronic, magnetic, optical, electromagnetic, infrared, and/or a semiconductor system (or apparatus or device). For example, the storage medium 204 includes a semiconductor or solid-state memory, a random access memory (RAM), a read-only memory (ROM), a magnetic tape, a removable computer diskette, a rigid magnetic disk, and/or an optical disk.

In some embodiments, the storage medium 204 includes the battery monitor 208, which can determine and monitor characteristics (efficiency, charge state, health state, voltage, or some other characteristic or quantity) of the power blocks 102 or the battery cells 108 in the power blocks 102. In some embodiments, the battery monitor 208 determines a characteristic of each of the battery cells 108. In some embodiments, the battery monitor 208 selects a number (e.g., a sample) of the battery cells 108 in the power blocks 102 and determines the characteristics of each of the selected battery cells 108. In some embodiments, one battery cell 108 from each power block 102 can be selected. In some embodiments, the battery monitor 208 determines an average of the characteristics of the (e.g., selected) battery cells 108 in the power blocks 102. An average of a characteristic can be determined by summing the characteristic of the one or more battery cells 108 and dividing the sum by the one or more battery cells 108.

In some embodiments, the battery monitor 208 determines a characteristics of each of the power blocks 102. For example, the battery monitor 208 determines the characteristic of the power block 102 by determining the characteristic of all of the battery cells 108 in that block 102. The batteries can be determined/measured in aggregate or individually and then the characteristic values summed together. The battery monitor 208 may determine the characteristic of each of the power blocks 102 by determining the characteristic of a selected number of battery cells 108 in that block 102.

Figure 3:
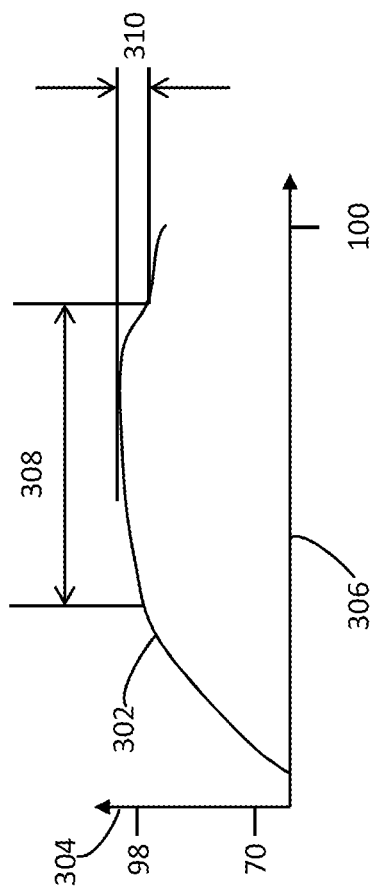
FIG. 3 illustrates a battery efficiency plot, in accordance with some embodiments of the present disclosure.

In some embodiments, the battery monitor 208 determines efficiency (e.g., an efficiency curve) for each of the power blocks 102, (e.g., selected) battery cells 108, and/or each of the power conditioning systems 110 in the power blocks 102. Referring now to FIG. 3, a battery efficiency plot 300 is illustrated, in accordance with some embodiments of the present disclosure. The efficiency plot 300 includes a curve 302 that represents the efficiency 304 versus the percentage of nameplate power 306 that the battery cell 108 is supplying (e.g., providing, drawing, etc.) to a load. The efficiency plot 300 includes a range 308 that represents the range of percentages of nameplate power 306 at which the efficiency 304 is within a maximum range 310. The maximum range 310 may be referred to as a maximum. In some embodiments, the battery monitor 208 determines efficiency of the battery cells 108 and/or each of the power conditioning systems 110 across the nameplate power percentages by causing the battery cell 108 and/or each of the power conditioning system 110 to provide power in accordance a nameplate power percentage and measuring the efficiency at that nameplate power percentage. This process can be repeated for a number of nameplate power percentages and for each of the (e.g., selected) battery cells 108 and/or each of the power conditioning systems 110. In some embodiments, the battery monitor 208 can determine efficiency with respect to real power and efficiency with respect to reactive power. The battery monitor 208 may control an instrument that measures the efficiency.

In some embodiments, the battery monitor 208 determines a charge state (e.g., state of charge, an amount of charge stored) for each of the power blocks 102 or (e.g., selected) battery cells 108 of the power blocks 102. In some embodiments, the battery monitor 208 determines the charge state by measuring a voltage of a battery cell 108 and multiplying the capacitance of the battery cell 108 by the voltage of the battery cell 108. In some embodiments, the battery monitor 208 determines the voltage of the battery cell 108 and stores the voltage as a proxy for the charge state. In some embodiments, the battery monitor 208 determines a balancing state for each power block 102 by determining a difference of a highest charge state (e.g., the highest battery cell voltage within the power block 102) and the lowest charge state (e.g., the lowest battery cell voltage within the power block 102). Generally, post-processing of the measured/determined data (such as determining a difference) can be performed by the battery monitor 208, the distribution optimizer 210, which is described below, or some other component of the energy management apparatus 104. The battery monitor 208 may control an instrument such as a voltmeter that determines the charge state.

In some embodiments, the battery monitor 208 determines a health state for each of the power blocks 102 or (e.g., selected) battery cells 108 of the power blocks 102. In some embodiments, the battery monitor 208 determines the health state by storing a time of installation or activation and determining a difference between current time and the stored time. In some embodiments, the battery monitor 208 determines the health state by running a timer that is initialized to zero when the battery cell 108 is installed or activated. The battery monitor 208 may run the timer when the battery cell 108 is enabled, or when the battery cell 108 is either enabled or idle. In some embodiments, the battery monitor 208 determines the health state by measuring throughput of the battery cell 108. The throughput may be defined as a total current or energy going into the battery cell 108, cumulative over time. Alternatively, the throughput may be defined as a total current or energy coming out of the battery cell 108, cumulative over time or the aggregate of both charge and discharge throughput. The battery monitor 208 may measure the throughput by measuring a current at a predetermined interval or event and, upon measuring the current, adding the current to a total current for that battery cell 108.

In some embodiments, the battery monitor 208 determines a health state degradation and/or efficiency degradation for each of the power blocks 102 or (e.g., selected) battery cells 108 of the power blocks 102. In some embodiments, the battery monitor 208 determines the health state degradation by maintaining a historical health state of the battery cell 108, measuring a current health state of the battery cell 108, and determining a ratio of the current health state and the historical health state. The historical health state may be the health state that was determined when the battery cell 108 was installed or at some other point during a life cycle of the battery cell 108.

In some embodiments, the battery monitor 208 determines thermal behavior for each of the power blocks 102 or (e.g., selected) battery cells 108 of the power blocks 102. For example, the battery monitor 208 determines one or more of a temperature or a change in temperature (e.g., temperature derivative) for each of the power blocks 102 or (e.g., selected) battery cells 108 of the power blocks 102.

The battery monitor 208 may store the nameplate power percentage, the efficiency, charge state, the efficiency degradation, and/or any other characteristic for each power block 102 or battery cell 108 for which the characteristic is measured in a memory or storage medium, for example in an LUT (look up table) 214 or other data structure within the memory or storage medium. Each battery cell 108 can have its own LUT 214 or other data structure, or groups of battery cells (e.g., the battery cells of the same battery string, the same power block 102, or same system 100) can share an LUT 214 or other data structure. The charge state and the efficiency degradation may be stored in the same LUT 214 or other data structure in which the efficiency is stored, or the charge state and the efficiency degradation may be stored in one or more separate LUTs 214 or other data structures. Although the battery monitor 208 measures and stores efficiency, charge state, and efficiency degradation, the battery monitor 208 may measure and store other characteristics of the battery cell 108 without departing from the scope of the present disclosure.

Referring now back to FIG. 2, in some embodiments, the storage medium 204 includes the distribution optimizer 210, which can be adapted to optimize a distribution of power from the battery cells 108 of FIG. 1 to an external load such as one or more devices coupled to the system 100 of FIG. 1 or to a power grid. For example, the distribution optimizer 210 can unevenly allocate power among various power blocks 102 and/or battery cells 108. The optimization distribution can be performed based on accessing the LUTs 214 or other data structures including the characteristics of the battery cells 108 stored by the battery monitor 208. In some embodiments, the distribution optimizer 210 is computer program code, a script, an application, a service, or other software, firmware, or hardware.

In some embodiments, the distribution optimizer 210 determines a threshold above which any efficiency is deemed within the range of maximum efficiency 310. The threshold can be predetermined or configured by the distribution optimizer 210 or predetermined or configured by a user or administrator accessing or programming the distribution optimizer 210 directly or via a user interface.

In some embodiments, the distribution optimizer 210 determines a range of percentages of a nameplate power in which the efficiency of the battery cells 108 in the power blocks 102 is within the range of maximum efficiency. The distribution optimizer 210 may determine the nameplate power percentages at which the efficiency is greater than the threshold by accessing the one or more LUTs 214 or other data structures. To determine an efficiency at a nameplate power percentage at which a measurement was not made, the distribution optimizer 210 can interpolate the efficiency using measured efficiency at least two nameplate power percentages (e.g., the nearest two). The distribution optimizer 210 can determine the range 308 of nameplate power percentages to be within those identified nameplate power percentages at which the efficiency is greater than the threshold.

In some embodiments, distribution optimizer 210 determines the power that is to be provided (e.g., to a load) from the battery cells 108. The distribution optimizer 210 may determine the power that is to be provided by measuring or determining a load characteristic (e.g., voltage, impedance, etc.) and calculating the power that is to be provided. In some embodiments, the distribution optimizer 210 determines the power that is to be provided by providing power and reading how much power is provided using a sensor or other instrument.

The distribution optimizer 210 can select a percentage (e.g., amount, portion) of the power that each of the (e.g., selected) power blocks 102 (e.g., battery strings) is to provide. The percentage is with reference to the total power being provided. The percentage can be positive, in which case the corresponding power block 102 is discharging, zero, negative, in which case the corresponding power block 102 is charging, or zero, in which case the corresponding power block 102 is neither charging or discharging. For example, power block 102A can be providing 60% of the power, power block 102B can be providing 60% of the power, and power block 102C can be "providing"–20% of the power. In this example, only power blocks 102A and 102B are providing power and discharging and power block 102C is consuming power and charging. The power block 102C can be viewed as a locally connected asset in this scenario.

In some embodiments, the distribution optimizer 210 selects a first percentage of the power that a first power block 102 is to provide to the load and a second percentage of the power that a second power block 102 at least based on the efficiency for each (e.g., selected) battery cell 108 of each power block 102 and the power to be provided to the load. For example, the distribution optimizer 210 selects power blocks 102A and 102B to provide 25% each and power block 102C to provide 50%. In some embodiments, the first percentage (e.g., the percentage that power block 102C provides) of the power is greater than the second percentage of the power (e.g., the percentage that each of the power blocks 102A and 102B provides).

In some embodiments, the distribution optimizer 210 selects a number of power blocks 102 to enable such that the number of power blocks 102 (e.g., the battery cells 108 therein) provide the determined power to the load at an efficiency within the range of maximum efficiency 310. (This can be viewed as an extreme example of unevenly allocated power.) For example, the distribution optimizer 210 enables the power block 102C and disables the power blocks 102A and 102B such that the battery cell 108C can provide the power to a load while operating within the range of within the maximum range of efficiency 310. The one or more power blocks 102 that are enabled may be selected randomly, using a round-robin approach, or using one of the considerations discussed below. The distribution optimizer 210 may select the power blocks 102 to enable by circulating each of the power blocks 102 between enabled/operating/discharging states, disabled/idle states, and/or charging states. For example, at a first time, the distribution optimizer 210 selects the power block 102C and disables/charges power blocks 102A and 102B; at a second time, the distribution optimizer 210 selects the power block 102B and disables/charges power blocks 102A and 102C; and, at a third time, the distribution optimizer 210 selects the power block 102A and disables/charges power blocks 102B and 102C. In some embodiments, the distribution optimizer 210 selects a number of battery cells 108 within the number of power blocks 102 to enable such that the number of battery cells 108 provide the determined power to the load at an efficiency within the range of maximum efficiency 310. In other words, the distribution optimizer 210 can select to enable all the battery cells 108 of a power block 102 or some of the battery cells 108 of a power block 102.

In some embodiments, the distribution optimizer 210 determines a charge state for each of the power blocks 102 or (e.g., selected) battery cells 108 of the power blocks 102. The distribution optimizer 210 may determine the charge state by accessing the one or more LUTs 214 or other data structures. The distribution optimizer 210 may rank the power blocks 102 or battery cells 108 based on the charge state of each power block 102 or battery cell 108. The distribution optimizer 210 may determine that a first charge stored by each battery cell 108 of a first power block 102 is greater than a second charge stored by each battery cell 108 of a second power block 102.

In some embodiments, the distribution optimizer 210 determines a charge state for each of the power blocks 102. The distribution optimizer 210 may determine that a first charge stored by a first power block 102 is greater than a second charge stored by a second power block 102. For example, the distribution optimizer 210 determines that a first charge stored by the power block 102C is greater than a second charge stored by the power block 102B.

In some embodiments, the distribution optimizer 210 selects a number of power blocks 102 based on a charge state for each of the (e.g., selected) battery cells 108 of the power blocks 102. For example, if it is determined that battery cell 108C has a higher charge state than battery cells 108A and 108B, and only one of the battery cells 108A-C is used to achieve efficiency in the range of maximum efficiency, then the distribution optimizer 210 can select the battery cell 108C. The distribution optimizer 210 may determine to enable all the battery cells 108 in the selected power blocks 102 or to enable some of the battery cells 108 in the selected power blocks 102 based on the charge state of the battery cells 108. In some embodiments, the distribution optimizer 210 selects a number of power blocks 102 to enable such that the number of battery cells 108 that are providing the determined power to the load at an efficiency within the range of maximum efficiency 310 are the battery cells 108 that have a predetermined charge state (e.g., the highest charge state, the most charge stored).

In some embodiments, the distribution optimizer 210 selects the first percentage of the power that the first power block 102 is to provide to the load and the second percentage of the power that the second power block 102 is to provide to the load at least based on the first charge stored by the first power block 102, or each battery cell 108 of the first power block 102, and the second charge stored by the second power block 102, or each battery cell 108 of the second power block 102. For example, the distribution optimizer 210 selects a first percentage of the power that the first power block 102C is to provide to the load and the second percentage of the power that the second power block 102B is to provide to the load.

In some embodiments, the distribution optimizer 210 selects the percentage of power to provide from each of the selected power blocks 102 to provide based on the charge state of the corresponding battery cells 108. The distribution optimizer 210 can provide a percentage of power for a battery cell 108 that is proportional to the charge state of the battery cell 108. For example, after the distribution optimizer 210 determines to select enable power blocks 102B and 102C and to provide power from battery cells 108B and 108C, the distribution optimizer decides to provide 60% of the power from battery cell 108B and 40% of the power from battery cell 108C because the battery cell 108B has a charge state of 60% of charge capacity and the battery cell 108C has a charge state of 40% of charge capacity. The distribution optimizer 210 may select the percentage of power to provide from each of the selected battery cells 108 such that the number of battery cells 108 that are providing the determined power to the load at an efficiency within the range of maximum efficiency 310 are providing a percentage of power based on the charge state.

In some embodiments, the distribution optimizer 210 determines an efficiency, charge state, balancing state, health state, health state degradation, efficiency degradation, charge rate, discharge rate, thermal behavior, other characteristic, or a combination thereof, for each of the power blocks 102 or each of the (e.g., selected) battery cells 108 of the power blocks 102. The distribution optimizer 210 may determine at least one of the efficiency, charge state, balancing state, health state, health state degradation, efficiency degradation, charge rate, discharge rate, thermal behavior, or other characteristic by accessing the one or more LUTs 214 or other data structures. In some embodiments, the distribution optimizer 210 selects a number of power blocks 102 and a number of battery cells 108 based on an efficiency, charge state, balancing state, health state, health state degradation, efficiency degradation, charge rate, discharge rate, thermal behavior, other characteristic, or a combination thereof, for each of the (e.g., selected) battery cells 108 of the power blocks 102. For example, the distribution optimizer 210 can select a number of power blocks 102 and a number of battery cells 108 that based on a combination of a charge state and a health state such that the number of battery cells 108 operate at an efficiency within a range of maximum efficiency. The distribution optimizer 210 can generate, for each battery cell, a score (e.g., a cost improvement score) based on one or more of an efficiency, charge state, balancing state, health state, health state degradation, efficiency degradation, charge rate, discharge rate, thermal behavior, or other characteristic, and select the power blocks 102 based on the score. For example, the distribution optimizer 210 can generate, for each battery cell 108, a first score based on the charge state (e.g., a higher charge state corresponds with a higher score) and a second score based on the age (e.g., a lower age corresponds with a higher score), add the first score and second score to generate a cost improvement score for the battery cell 108, add the cost improvement scores of each of the battery cells 108 in a power block 102 to generate a cost improvement score for the power block 102, and select the power blocks 102 with the highest cost improvement score. The first score and the second score can be weighted, and the weighted scores can be added to generate the total score.

In some embodiments, the distribution optimizer 210 selects the percentage of power to provide from each of the selected battery cells 108 to provide based on the efficiency, charge state, balancing state, health state, health state degradation, efficiency degradation, charge rate, discharge rate, thermal behavior, other characteristic, or a combination thereof. For example, the distribution optimizer 210 can provide a percentage of power for a power block 102 that is proportional to the health state of each of the battery cells 108 in the power block 102. In another example, the distribution optimizer 210 can generate, for each battery cell 108, a first score based on the charge state and a second score based on the health state, add the first score and second score to generate a total score, and provide power from each power block 102 in proportion to the overall score.

In some embodiments, the distribution optimizer 210 determines that a first charge stored by a first power block 102, or each battery cell 108 of the first power block 102, is greater than a second charge stored by a second power block 102, or each battery cell 108 of the second power block 102. In some embodiments, the distribution optimizer 210 selects a first discharge rate at which the first power block 102 is to discharge and a second discharge rate at which the second power block 102 is to discharge based on the first charge stored by the first power block 102, or each battery cell 108 of the first power block 102, being higher than the second charge stored by the second power block 102, or each battery cell 108 of the second power block 102. In some embodiments, the first discharge rate is lower than the second discharge rate. In some embodiments, the distribution optimizer 210 selects a first charge rate at which the first power block 102 is to charge and a second charge rate at which the second power block 102 is to charge based on the first charge stored by the first power block 102, or each battery cell 108 of the first power block 102, being higher than the second charge stored by the second power block 102, or each battery cell 108 of the second power block 102. In some embodiments, the first charge rate is lower than the second charge rate.

In some embodiments, the distribution optimizer 210 determines that the charge state of a power block 102 is balanced (e.g., the difference between the maximum battery cell charge and the minimum battery cell charge is below a predetermined threshold, the difference between the maximum battery cell voltage and the minimum battery cell voltage is below a predetermined threshold, etc.). In some embodiments, in response to determining that a state of charge of the power block 102 is balanced, the distribution optimizer 210 selects the power block 102 to provide power (e.g., causes the power block 102 to be enabled and provide power). In some embodiments, the distribution optimizer 210 determines that the charge state of a power block 102 is unbalanced (e.g., the difference between the maximum battery cell charge and the minimum battery cell charge is above a predetermined threshold, the difference between the maximum battery cell voltage and the minimum battery cell voltage is above a predetermined threshold, etc.). In some embodiments, in response to determining that a state of charge of the power block 102 is unbalanced, distribution optimizer 210 selects the power block 102 to charge (e.g., causes the second power block 102 to charge until the charge state of the power block 102 is balanced). In some embodiments, the distribution optimizer 210 selects the percentage of power to provide from each of the selected battery cells 108 to provide based on the balancing state.

In some embodiments, the distribution optimizer 210 determines that a thermal profile is more optimal for a first power block 102 than for a second power block 102. For example, the distribution optimizer 210 determines that a temperature or a change in temperature of a first power block 102 is less than a temperature or a change in temperature of a second power block 102. In some embodiments, the distribution optimizer 210 selects the percentage of power to provide from each of the selected battery cells 108 to provide based on the thermal profile.

In some embodiments, the distribution optimizer 210 determines that the first power block 102 discharges to a first predetermined threshold and the second power block 102 charges to a second predetermined threshold. In some embodiments, the distribution optimizer 210 selects the first percentage of the power that the first power block of the plurality of power blocks is to provide and the second percentage of the power that the second power block of the plurality of power blocks is to provide at least based on determining that the first power block of the plurality of power blocks discharging to the first predetermined threshold and the second power block of the plurality of power blocks charging to the second predetermined threshold.

In some embodiments, the distribution optimizer 210 determines that a first power block 102 is discharging (a.k.a., providing a percentage of power greater than zero) and that a second power block 102 is charging or idling (a.k.a., providing a percentage of power less than or equal to zero). In some embodiments, the distribution optimizer 210 determines that the first power block 102 either provides a predetermined amount of power or throughput. In some embodiments, in response to determining that the first power block 102 either provides a predetermined amount of power or throughput, the distribution optimizer 210 selects the first power block 102 to charge or to idle, and selects the second power block 102 to discharge.

In some embodiments, the storage medium 204 includes the command generator 212, which can be adapted to generate commands, send commands to an appropriate component, or both. In some embodiments, the command generator 212 generates a dispatch command to enable the selected battery cells 108 of the selected power blocks 102 in accordance with the efficiency, charge state, balancing state, health state, health state degradation, efficiency degradation, thermal behavior, other characteristic of the battery cell 108, or a combination thereof (such as in accordance with a cost improvement score). For example, the command generator 212 sends a dispatch command to enable a first percentage of the power blocks 102 and disable a second percentage of the power blocks 102 such that each of the battery cells 108 of the first percentage of the power blocks 102 are providing power within the range of percentages of the nameplate power of the respective battery cell of the plurality of power blocks. In some embodiments, the power blocks 102 selected to be enabled, or the percentages of powers for each of the (e.g., selected) power blocks 102, can be selected based on efficiency, charge state, balancing state, health state, health state degradation, efficiency degradation, thermal behavior, other characteristic of the battery cell 108, or a combination thereof. Details are discussed with respect to the distribution optimizer 210.

In some embodiments, the distribution optimizer 210 determines an idle period for the system 100 (e.g., a period during which the power blocks 102 will not provide power to a remotely connected load). In some embodiments, the distribution optimizer 210 determines losses for the idle period (e.g., the power needed to run the auxiliary load panel 106 or other components that are enabled during the idle period). In some embodiments, the distribution optimizer 210 selects one or more power blocks 102 to be enabled during the idle period to account for the losses during the idle period (e.g., to provide power to the auxiliary load panel 106 or another locally connected load). In some embodiments, the command generator 212 generates an idle command to disable the power blocks 102, including the battery cells 108. In some embodiments, the command generator 212 generates an idle command to (only) enable the one or more power blocks 102, during the idle period, sufficient to provide power to the auxiliary load panel 106 (and to disable the remaining power blocks 102).

In some embodiments, the command generator 212 generates a command in accordance with a markup language such as extensible markup language (XML) or hypertext markup language (HTML), any language using tags, such as JavaScript object notation (JSON), or any language using bit-packing. In some embodiments, the command generator 212 sends the command to an interface such as application programming interface (API).

In some embodiments, the energy management apparatus 200 includes a network interface 206. The network interface 206 allows components of the energy management apparatus 200 to communicate with each other. The network interface 206 includes wireless network interfaces such as Bluetooth, Wi-Fi, Global System for Mobile Communications (GSM), wideband code division multiple access (WCDMA), Long-Term Evolution (LTE), or 5G; or wired network interfaces such as Ethernet or Universal Serial Bus (USB).

In some embodiments, the energy management apparatus 200 includes a bus 220. The bus 220 may couple the processor 202, the storage medium 204, and the network interface 206. The bus 220 can include a USB bus, a SCSI bus, a FireWire bus, an Ethernet bus, a Gigabit Ethernet bus, a Fibre Channel bus, or a Thunderbolt bus.

Figure 4:
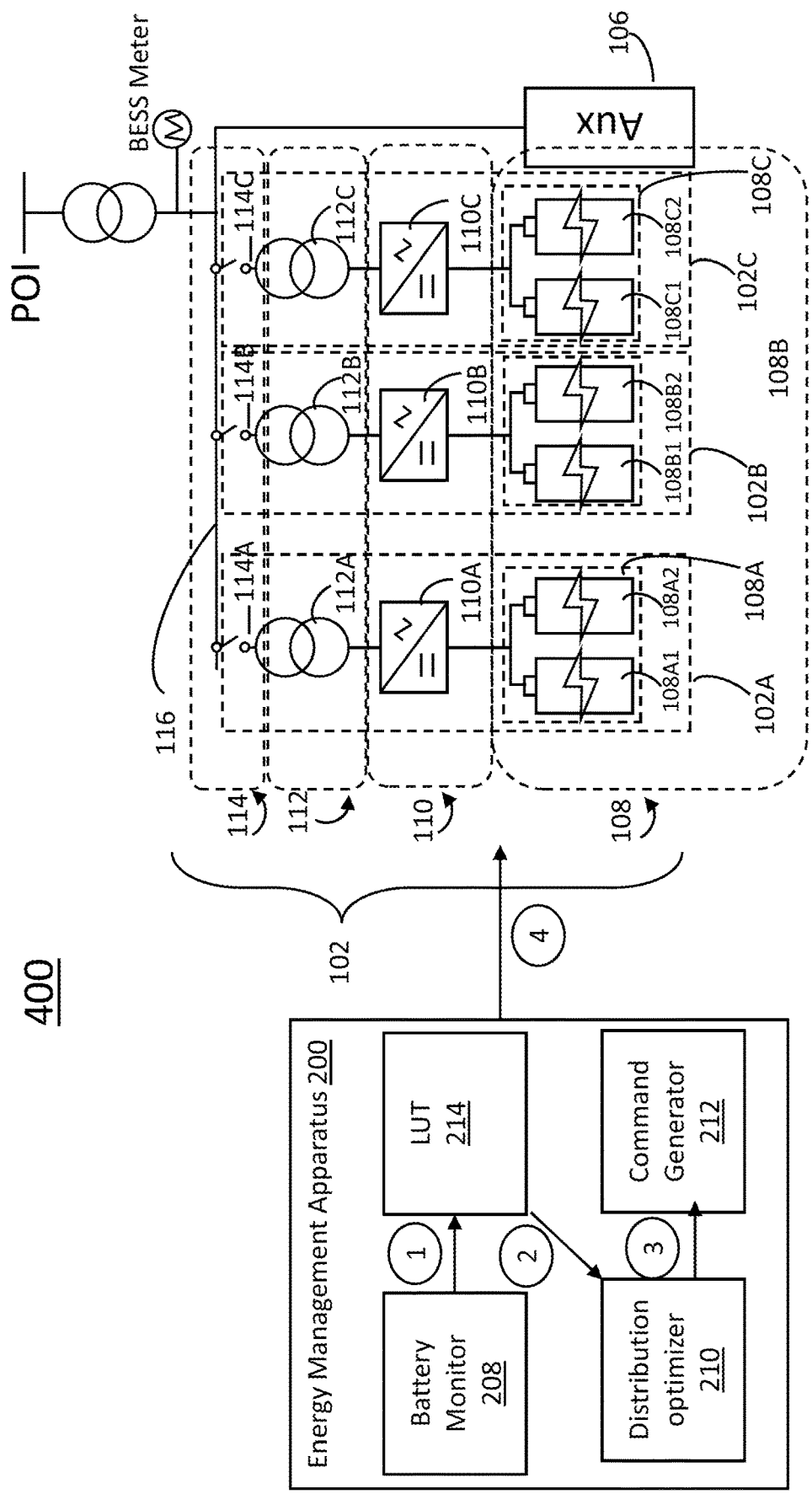
FIG. 4 illustrates a flow diagram of a method for optimizing power distribution, in accordance with some embodiments of the present disclosure.

FIG. 4 illustrates a block-flow diagram of a method 400 for optimizing power distribution, in accordance with some embodiments of the present disclosure. Although the method 400 is performed by the energy management apparatus 200, other implementations of the energy management apparatus 104 may perform the method 400 without departing from the scope of the present disclosure.

At step 1, the battery monitor 208 determines characteristics of each of the battery cells 108 and stores the characteristics in an LUT 214. The LUT 214 may be located in a storage medium, such as process memory, a memory stick, or a long-term storage device.

At step 2 the distribution optimizer 210 fetches the characteristics from the LUT 214, determines which power blocks 102 (and which corresponding battery cells 108) to enable, and how much of the power each of the (e.g., selected) power blocks 102 is to provide (e.g., to a load), based on the characteristics of each of the battery cells 108 and communicates to the command generator 212 one or more of the selected power blocks 102, the selected battery cells 108, or the percentage of provided power for each of the selected battery cells 108. As an example of selecting based on characteristics, the distribution optimizer 210 determines that selects power block 102C and disables the power blocks 102A and 102B based on determining that the battery cell 108C can provide the power to a load while operating within the range of within the maximum range of efficiency 310 and the battery cell 108C has a highest charge state. In another example of selecting based on characteristics, the distribution optimizer 210 selects power block 102B to provide a first percentage of the power, selects power block 102C to provide a second percentage of the power, and disables the power blocks 102A based on determining that the battery cells 108B and 108C can provide the power to a load while operating within the range of within the maximum range of efficiency 310, the battery cell 108B has a charge state of a first amount, and the battery cell 108C has a charge state of a second amount. In some embodiments, the ratio of the first percentage and the second percentage can be equal to the ratio of the first amount and the second amount.

At step 3, the command generator 212 generates a dispatch command based on one or more of the selected power blocks 102, the selected battery cells 108, or the percentage of provided power for each of the selected battery cells 108. The command generator 212 may send the dispatch command to each of the power blocks 102 or to one or more components that control enabling of the power blocks 102, such as the switches 114. At step 4, the power blocks 102 operate in accordance with the dispatch command.

Figure 5:
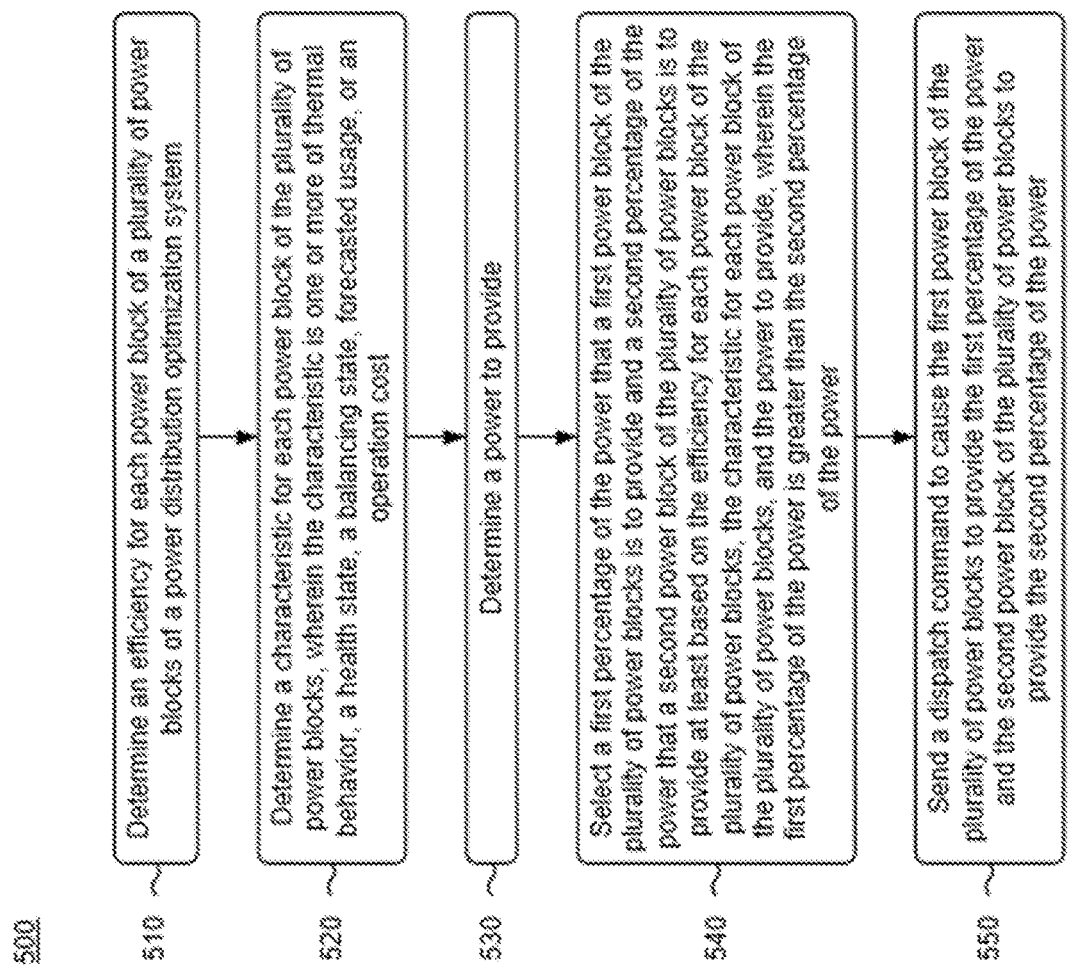
FIG. 5 illustrates a block-flow diagram of a method for optimizing power distribution, in accordance with some embodiments of the present disclosure.

FIG. 5 illustrates a flow diagram of a method 500 for optimizing power distribution, in accordance with some embodiments of the present disclosure. The method 500 may be implemented using, or performed by, the system 100, one or more components (e.g., the energy management apparatus 104, the battery monitor 208, the distribution optimizer 210, the command generator 212, etc.) of the system 100, a processor associated with the system 100, or a processor of the one or more components of the system 100. Additional, fewer, or different operations may be performed in the method 500 depending on the embodiment. Additionally, or alternatively, two or more of the blocks of the method 500 may be performed in parallel.

At operation 510, the processor (e.g., the processor 202 of the energy management apparatus 104) determines an efficiency for each power block (e.g., each of the power blocks 102) of a plurality of power blocks, including at least a first power block and a second power block. In some embodiments, the processor determines a range of percentages of a nameplate power for each power block in which an efficiency of the respective power block is in a range of maximum efficiency. The efficiency can be determined by measuring the efficiency (e.g., via battery monitor 208) and storing the efficiency in a LUT (e.g., the LUT 214) or other data structure from a storage medium, which can be accessed (e.g., via the distribution optimizer 210).

At operation 520, the processor determines a characteristic for each power block of the plurality of power blocks. In some embodiments, the characteristic is one or more of thermal behavior, state of health, balancing state, forecasted usage, or an operation cost. At operation 530, the processor determines a power to be provided. The power may be provided to a load. The power may be provided to one or more locally connected assets, one or more remotely connected assets, or a combination thereof.

In some embodiments, determines that a first charge stored by the first power block of the plurality of power blocks is greater than a second charge stored by the second power block of the plurality of power blocks. In some embodiments, the processor determines that the second power block of the plurality of power blocks includes a difference of a maximum battery cell voltage and a minimum battery cell voltage that is greater than a predetermined threshold. In some embodiments, the processor determines that a health state of the first power block of the plurality of power blocks is greater than a health state of the second power block of the plurality of power blocks. In some embodiments, the processor determines that a temperature of the second power block of the plurality of power blocks is greater than a temperature of the first power block of the plurality of power blocks. In some embodiments, the processor determines that the first power block of the plurality of power blocks discharges to a first predetermined threshold and the second block of the plurality of power blocks charges to a second predetermined threshold.

At operation 540, the processor selects (e.g., via the distribution optimizer 210) a first percentage of the power that the first power block (e.g., power block 102C) is to provide and a second percentage of the power that the second power block (e.g., power block 102B) is to provide at least based on the efficiency for each power block, the characteristic, and the power to be provided. In some embodiments, the first percentage of the power is greater than the second percentage of the power. In some embodiments, the first and second percentages are positive. In some embodiments, the first percentage is positive and the second percentage is negative. In some embodiments, each of the battery cells of the first and second power blocks are providing power within the range of percentages of the nameplate power of the respective power block.

In some embodiments, the processor selects the first percentage of the power that the first power block of the plurality of power blocks is to provide and the second percentage of the power that the second power block of the plurality of power blocks is to provide at least based on determining that the first charge stored by the first power block of the plurality of power blocks is greater than the second charge stored by the second power block of the plurality of power blocks. In some embodiments, the processor selects the first percentage of the power that the first power block of the plurality of power blocks is to provide and the second percentage of the power that the second power block of the plurality of power blocks is to provide at least based on determining that the second power block of the plurality of power blocks includes the difference of the maximum battery cell voltage and the minimum battery cell voltage that is greater than the predetermined threshold. In some embodiments, the processor selects the first percentage of the power that the first power block of the plurality of power blocks is to provide and the second percentage of the power that the second power block of the plurality of power blocks is to provide at least based on determining that the health state of the first power block of the plurality of power blocks is greater than the health state of the second power block of the plurality of power blocks. In some embodiments, the processor selects a third percentage of the power that the second power block of the plurality of power blocks is to provide in response to determining that the temperature of the second power block of the plurality of power blocks is greater than the temperature of the first power block of the plurality of power blocks, wherein the third percentage of the power is less than the second percentage of the power. In some embodiments, the processor selects the first percentage of the power that the first power block of the plurality of power blocks is to provide and the second percentage of the power that the second power block of the plurality of power blocks is to provide at least based on determining that the first power block of the plurality of power blocks discharges to the first predetermined threshold and the second power block of the plurality of power blocks charges to the second predetermined threshold At operation 550, the processor sends (e.g., via the command generator 212) a dispatch command to cause the first power block to provide the first percentage of the power and the second power block of to provide the second percentage of the power. In some embodiments, the dispatch command causes a third power block (e.g., the power block 102A) to be disabled such that the first and second power blocks of the are providing power within the range of percentages of the nameplate power of the respective power block.

In some embodiments, the processor determines that two power blocks of the plurality of power blocks are sufficient to provide power (e.g., to the load). In some embodiments, the processor select a third percentage of the power that a third power block of the plurality of power blocks is to provide, wherein the third percentage is zero or less. For example, the processor selects a third power block to be disabled from providing power. In some embodiments, the processor determines that first and second blocks provide a predetermined amount of power. In some embodiments, after (e.g., in response to) determining that the first and second blocks provide a predetermined amount of power, the processor changes the second percentage to zero or less and changes the third percentage to greater than zero. For example, the processor selects the first power block and the third power block to provide power and selects the second power block to be disabled from providing power. In some embodiments, each power block includes a power conditioning system (e.g., inverter and/or other conditioning components) coupled to the battery cell and a switch coupled in series with the power conditioning system and the at least one battery cell. In some embodiments, the method 500 includes sending a second dispatch command to couple the first power block to the load via a switch of the first power block and decouple the second power block from the load via a switch of the second power block.

In some embodiments, the processor determines an idle period. In some embodiments, the processor determines a power loss during the idle period. In some embodiments, the processor selects the first power block of the plurality of power blocks to provide, during the idle period, a first power equivalent to the power loss. In some embodiments, the processor sends an idle command to cause the plurality of power blocks, except for the first power block of the plurality of power blocks, to be disabled during the idle period. In some embodiments, the idle command can include a command to cause the first power block of the plurality of power blocks to provide the first power equivalent to the power loss. In some embodiments, each power conditioning system is coupled to an auxiliary load panel that powers the power conditioning system. The power loss may be due to operation of the auxiliary load panel during the idle period.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. A power distribution optimization system, comprising:
a plurality of power blocks, wherein each power block of the plurality of power blocks comprises a power conditioning system and at least one battery coupled to the power conditioning system;
an energy management apparatus coupled to the plurality of power blocks, wherein the energy management apparatus comprises a processor and a memory, wherein the memory comprises programmed instructions that, when executed by the processor, cause the energy management apparatus to:
determine an efficiency for each power block of the plurality of power blocks;
determine a characteristic for each power block of the plurality of power blocks, wherein the characteristic is one or more of thermal behavior, a health state, a balancing state, forecasted usage, or an operation cost;
determine a power to provide;
select a first percentage of the power that a first power block of the plurality of power blocks is to provide and a second percentage of the power that a second power block of the plurality of power blocks is to provide at least based on the efficiency for each power block of the plurality of power blocks, the characteristic for each power block of the plurality of power blocks, and the power to provide, wherein the first percentage of the power is greater than the second percentage of the power; and
send a dispatch command to cause the first power block of the plurality of power blocks to provide the first percentage of the power and the second power block of the plurality of power blocks to provide the second percentage of the power.

2. The power distribution optimization system of claim 1, wherein the second percentage of the power is a negative percentage such that the second power block is to charge.

3. The power distribution optimization system of claim 1, wherein the efficiency is a range of maximum efficiency, and wherein the memory comprises the programmed instructions that, when executed by the processor, further cause the energy management apparatus to:
select the first percentage of the power at least based on determining that the first power block of the plurality of power blocks provides the first percentage of the power while within the range of maximum efficiency.

4. The power distribution optimization system of claim 1, wherein the memory comprises the programmed instructions that, when executed by the processor, further cause the energy management apparatus to:
determine that a first charge stored by the first power block of the plurality of power blocks is greater than a second charge stored by the second power block of the plurality of power blocks; and
select the first percentage of the power that the first power block of the plurality of power blocks is to provide and the second percentage of the power that the second power block of the plurality of power blocks is to provide at least based on determining that the first charge stored by the first power block of the plurality of power blocks is greater than the second charge stored by the second power block of the plurality of power blocks.

5. The power distribution optimization system of claim 1, wherein the memory comprises the programmed instructions that, when executed by the processor, further cause the energy management apparatus to:
determine that the second power block of the plurality of power blocks includes a difference of a maximum battery cell voltage and a minimum battery cell voltage that is greater than a predetermined threshold; and
select the first percentage of the power that the first power block of the plurality of power blocks is to provide and the second percentage of the power that the second power block of the plurality of power blocks is to provide at least based on determining that the second power block of the plurality of power blocks includes the difference of the maximum battery cell voltage and the minimum battery cell voltage that is greater than the predetermined threshold.

6. The power distribution system of claim 1, wherein the memory comprises the programmed instructions that, when executed by the processor, further cause the energy management apparatus to:

determine that the first power block of the plurality of power blocks discharges to a first predetermined threshold;
determine that the second block of the plurality of power blocks charges to a second predetermined threshold; and
select the first percentage of the power that the first power block of the plurality of power blocks is to provide and the second percentage of the power that the second power block of the plurality of power blocks is to provide at least based on determining that the first power block of the plurality of power blocks discharges to the first predetermined threshold and the second power block of the plurality of power blocks charges to the second predetermined threshold.

7. The power distribution optimization system of claim 1, wherein the memory comprises the programmed instructions that, when executed by the processor, further cause the energy management apparatus to:
determine that a health state of the first power block of the plurality of power blocks is greater than a health state of the second power block of the plurality of power blocks; and
select the first percentage of the power that the first power block of the plurality of power blocks is to provide and the second percentage of the power that the second power block of the plurality of power blocks is to provide at least based on determining that the health state of the first power block of the plurality of power blocks is greater than the health state of the second power block of the plurality of power blocks.

8. The power distribution optimization system of claim 1, wherein the memory comprises the programmed instructions that, when executed by the processor, further cause the energy management apparatus to:
determine that a temperature of the second power block of the plurality of power blocks is greater than a temperature of the first power block of the plurality of power blocks; and
select a third percentage of the power that the second power block of the plurality of power blocks is to provide in response to determining that the temperature of the second power block of the plurality of power blocks is greater than the temperature of the first power block of the plurality of power blocks, wherein the third percentage of the power is less than the second percentage of the power.

9. The power distribution optimization system of claim 1, wherein the memory comprises the programmed instructions that, when executed by the processor, further cause the energy management apparatus to:
select a third percentage of the power that a third power block of the plurality of power blocks is to provide, wherein the third percentage is zero or less; and
after the first and second power blocks provide a predetermined amount of power:
change the second percentage to zero or less; and
change the third percentage to greater than zero.

10. The power distribution optimization system of claim 1, wherein the memory comprises the programmed instructions that, when executed by the processor, further cause the energy management apparatus to:
determine a power loss that occurs during an idle period;
select the first power block of the plurality of power blocks to provide, during the idle period, a first power equivalent to the power loss; and
send an idle command to cause the plurality of power blocks, except for the first power block of the plurality of power blocks, to be disabled during the idle period.

11. A non-transitory computer readable medium comprising instructions that, when executed by a processor, cause the processor to:
determine an efficiency for each power block of a plurality of power blocks of a power distribution optimization system;
determine a characteristic for each power block of the plurality of power blocks, wherein the characteristic is one or more of thermal behavior, a health state, a balancing state, forecasted usage, or an operation cost;
determine a power to provide;
select a first percentage of the power that a first power block of the plurality of power blocks is to provide and a second percentage of the power that a second power block of the plurality of power blocks is to provide at least based on the efficiency for each power block of the plurality of power blocks, the characteristic for each power block of the plurality of power blocks, and the power to provide, wherein the first percentage of the power is greater than the second percentage of the power; and
send a dispatch command to cause the first power block of the plurality of power blocks to provide the first percentage of the power and the second power block of the plurality of power blocks to provide the second percentage of the power.

12. The medium of claim 11, wherein the second percentage of the power is a negative percentage such that the second power block is to charge.

13. The medium of claim 11, wherein the efficiency is a range of maximum efficiency, and wherein the medium comprises the instructions that, when executed by the processor, further cause the processor to:
select the first percentage of the power at least based on determining that the first power block of the plurality of power blocks provides the first percentage of the power while within the range of maximum efficiency.

14. The medium of claim 11, comprising the instructions that, when executed by the processor, further cause the processor to:
determine that a first charge stored by the first power block of the plurality of power blocks is greater than a second charge stored by the second power block of the plurality of power blocks; and
select the first percentage of the power that the first power block of the plurality of power blocks is to provide and the second percentage of the power that the second power block of the plurality of power blocks is to provide at least based on determining that the first charge stored by the first power block of the plurality of power blocks is greater than the second charge stored by the second power block of the plurality of power blocks.

15. The medium of claim 11, comprising the instructions that, when executed by the processor, further cause the processor to:
determine that the second power block of the plurality of power blocks includes a difference of a maximum battery cell voltage and a minimum battery cell voltage that is greater than a predetermined threshold; and
select the first percentage of the power that the first power block of the plurality of power blocks is to provide and the second percentage of the power that the second power block of the plurality of power blocks is to provide at least based on determining that the second power block of the plurality of power blocks includes the difference of the maximum battery cell voltage and the minimum battery cell voltage that is greater than the predetermined threshold.

16. The medium of claim 11, comprising the instructions that, when executed by the processor, further cause the processor to:
  determine that the first power block of the plurality of power blocks discharges to a first predetermined threshold;
  determine that the second block of the plurality of power blocks charges to a second predetermined threshold; and
  select the first percentage of the power that the first power block of the plurality of power blocks is to provide and the second percentage of the power that the second power block of the plurality of power blocks is to provide at least based on determining that the first power block of the plurality of power blocks discharges to the first predetermined threshold and the second power block of the plurality of power blocks charges to the second predetermined threshold.

17. The medium of claim 11, comprising the instructions that, when executed by the processor, further cause the processor to:
  determine that a health state of the first power block of the plurality of power blocks is greater than a health state of the second power block of the plurality of power blocks; and
  select the first percentage of the power that the first power block of the plurality of power blocks is to provide and the second percentage of the power that the second power block of the plurality of power blocks is to provide at least based on determining that the health state of the first power block of the plurality of power blocks is greater than the health state of the second power block of the plurality of power blocks.

18. The medium of claim 11, comprising the instructions that, when executed by the processor, further cause the processor to:
  determine that a temperature of the second power block of the plurality of power blocks is greater than a temperature of the first power block of the plurality of power blocks; and
  select a third percentage of the power that the second power block of the plurality of power blocks is to provide in response to determining that the temperature of the second power block of the plurality of power blocks is greater than the temperature of the first power block of the plurality of power blocks, wherein the third percentage of the power is less than the second percentage of the power.

19. The medium of claim 11, comprising the instructions that, when executed by the processor, further cause the processor to:
  select a third percentage of the power that a third power block of the plurality of power blocks is to provide, wherein the third percentage is zero or less; and
  after the first and second power blocks provide a predetermined amount of power:
    change the second percentage to zero or less; and
    change the third percentage to greater than zero.

20. The medium of claim 11, comprising the instructions that, when executed by the processor, further cause the processor to:
  determine a power loss that occurs during an idle period;
  select the first power block of the plurality of power blocks to provide, during the idle period, a first power equivalent to the power loss; and
  send an idle command to cause the plurality of power blocks, except for the first power block of the plurality of power blocks, to be disabled during the idle period.

21. A method comprising:
  determining, by a processor, an efficiency for each power block of a plurality of power blocks of a power distribution optimization system;
  determining, by the processor, a characteristic for each power block of the plurality of power blocks, wherein the characteristic is one or more of thermal behavior, a health state, a balancing state, forecasted usage, or an operation cost;
  determining, by the processor, a power to provide;
  selecting, by the processor, a first percentage of the power that a first power block of the plurality of power blocks is to provide and a second percentage of the power that a second power block of the plurality of power blocks is to provide at least based on the efficiency for each power block of the plurality of power blocks, the characteristic for each power block of the plurality of power blocks, and the power to provide, wherein the first percentage of the power is greater than the second percentage of the power; and
  sending, by the processor, a dispatch command to cause the first power block of the plurality of power blocks to provide the first percentage of the power and the second power block of the plurality of power blocks to provide the second percentage of the power.

22. The method of claim 21, wherein the second percentage of the power is a negative percentage such that the second power block is to charge.

23. The method of claim 21, wherein the efficiency is a range of maximum efficiency, the method further comprising:
  selecting, by the processor, the first percentage of the power at least based on determining that the first power block of the plurality of power blocks provides the first percentage of the power while within the range of maximum efficiency.

24. The method of claim 21, further comprising:
  determining, by the processor, that a first charge stored by the first power block of the plurality of power blocks is greater than a second charge stored by the second power block of the plurality of power blocks; and
  selecting, by the processor, the first percentage of the power that the first power block of the plurality of power blocks is to provide and the second percentage of the power that the second power block of the plurality of power blocks is to provide at least based on determining that the first charge stored by the first power block of the plurality of power blocks is greater than the second charge stored by the second power block of the plurality of power blocks.

25. The method of claim 21, further comprising:
  determining, by the processor, that the second power block of the plurality of power blocks includes a difference of a maximum battery cell voltage and a minimum battery cell voltage that is greater than a predetermined threshold; and
  selecting, by the processor, the first percentage of the power that the first power block of the plurality of power blocks is to provide and the second percentage of the power that the second power block of the plurality of power blocks is to provide at least based on determining that the second power block of the plurality of power blocks includes the difference of the maximum battery cell voltage and the minimum battery cell voltage that is greater than the predetermined threshold.

26. The method of claim 21, further comprising:

determining, by the processor, that the first power block of the plurality of power blocks discharges to a first predetermined threshold;

determining, by the processor, that the second block of the plurality of power blocks charges to a second predetermined threshold; and selecting, by the processor, the first percentage of the power that the first power block of the plurality of power blocks is to provide and the second percentage of the power that the second power block of the plurality of power blocks is to provide at least based on determining that the first power block of the plurality of power blocks discharges to the first predetermined threshold and the second power block of the plurality of power blocks charges to the second predetermined threshold.

27. The method of claim 21, further comprising:

determining, by the processor, that a health state of the first power block of the plurality of power blocks is greater than a health state of the second power block of the plurality of power blocks; and selecting, by the processor, the first percentage of the power that the first power block of the plurality of power blocks is to provide and the second percentage of the power that the second power block of the plurality of power blocks is to provide at least based on determining that the health state of the first power block of the plurality of power blocks is greater than the health state of the second power block of the plurality of power blocks.

28. The method of claim 21, further comprising:

determining, by the processor, that a temperature of the second power block of the plurality of power blocks is greater than a temperature of the first power block of the plurality of power blocks; and selecting, by the processor, a third percentage of the power that the second power block of the plurality of power blocks is to provide in response to determining that the temperature of the second power block of the plurality of power blocks is greater than the temperature of the first power block of the plurality of power blocks, wherein the third percentage of the power is less than the second percentage of the power.

29. The method of claim 21, further comprising:

selecting, by the processor, a third percentage of the power that a third power block of the plurality of power blocks is to provide, wherein the third percentage is zero or less; and after the first and second power blocks provide a predetermined amount of power:
  changing, by the processor, the second percentage to zero or less; and
  changing, by the processor, the third percentage to greater than zero.

30. The method of claim 21, further comprising:

determining, by the processor, a power loss that occurs during an idle period;

selecting, by the processor, the first power block of the plurality of power blocks to provide, during the idle period, a first power equivalent to the power loss; and send an idle command to cause the plurality of power blocks, except for the first power block of the plurality of power blocks, to be disabled during the idle period.

* * * * *